March 31, 1964    A. E. W. JOHNSON ETAL    3,127,193
TANDEM TRACTOR HITCH
Filed July 10, 1962    6 Sheets-Sheet 5
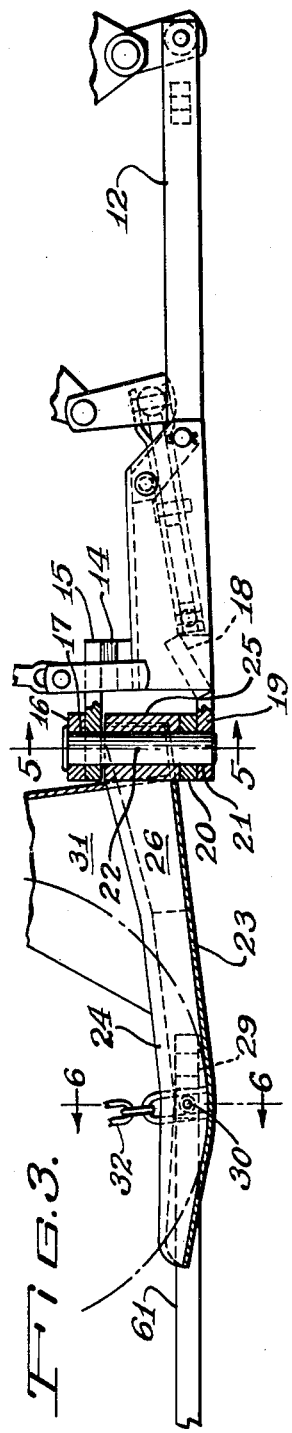
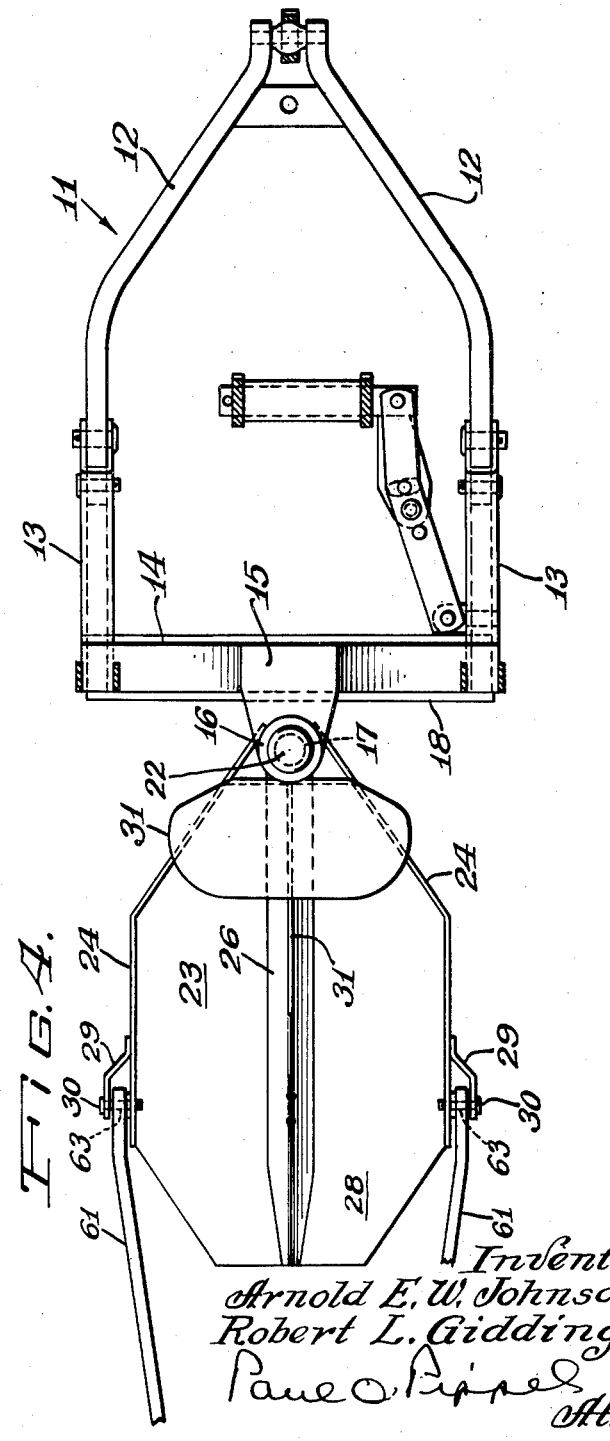
Inventors:
Arnold E. W. Johnson
Robert L. Giddings
Paul O. Pippel
Atty.

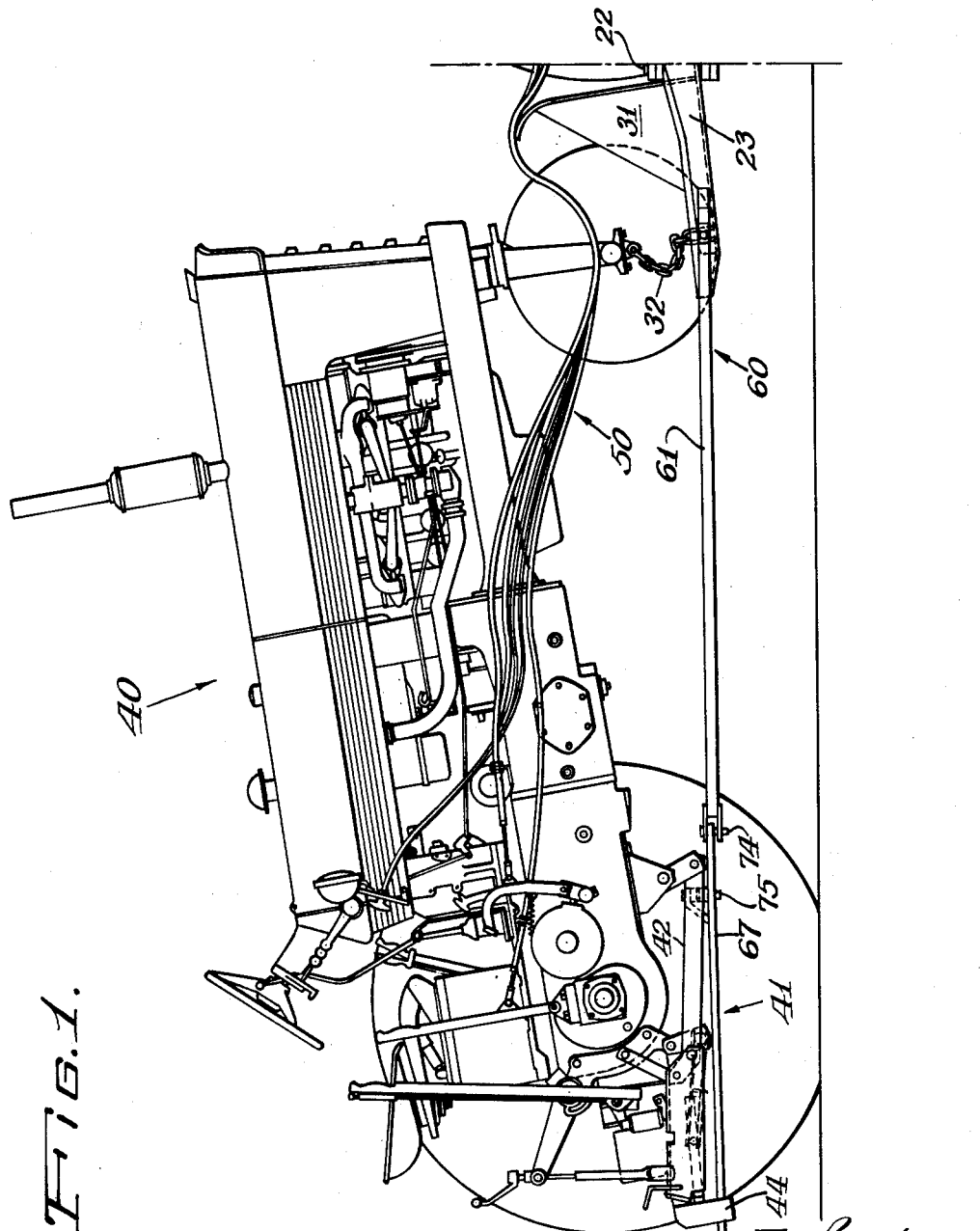

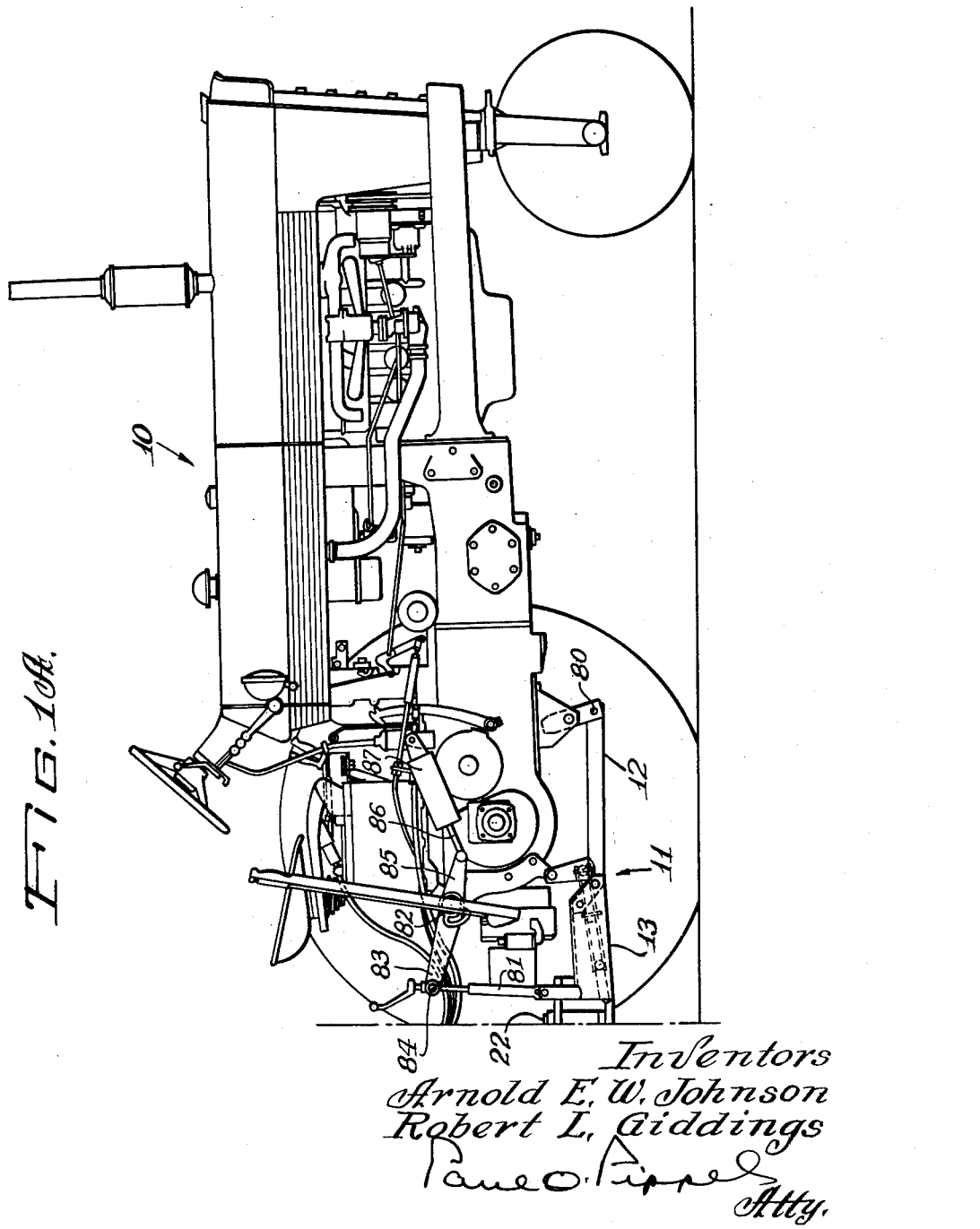

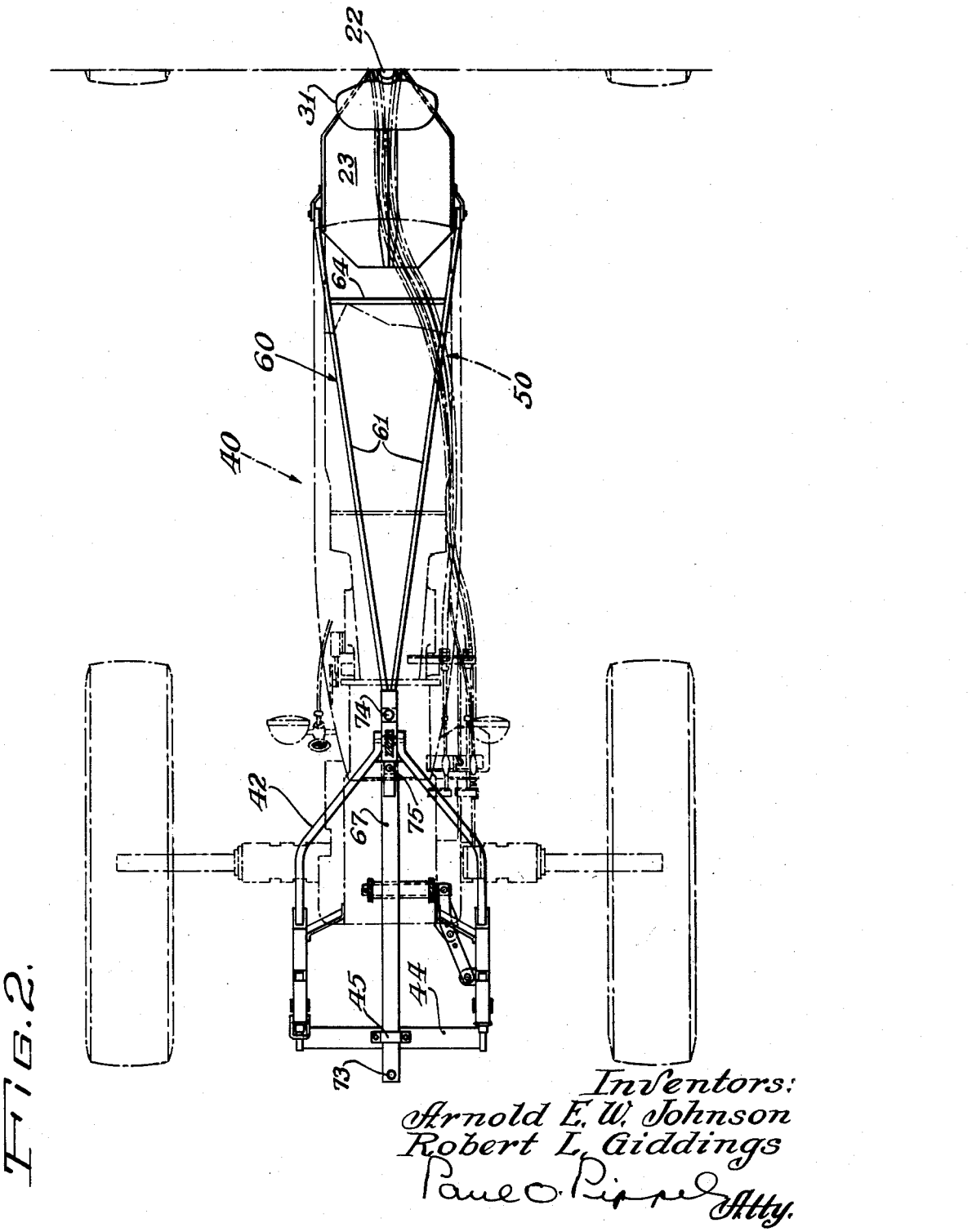

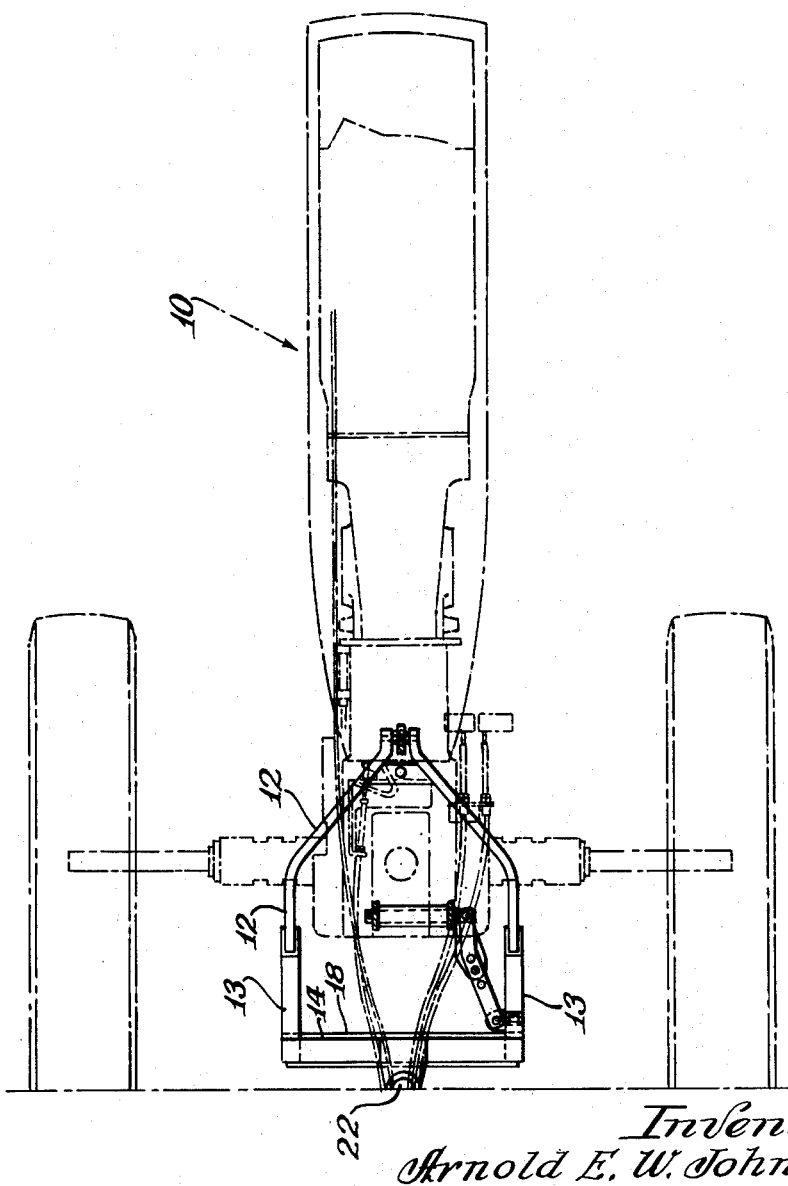

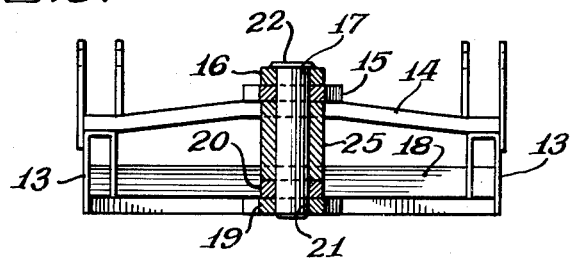
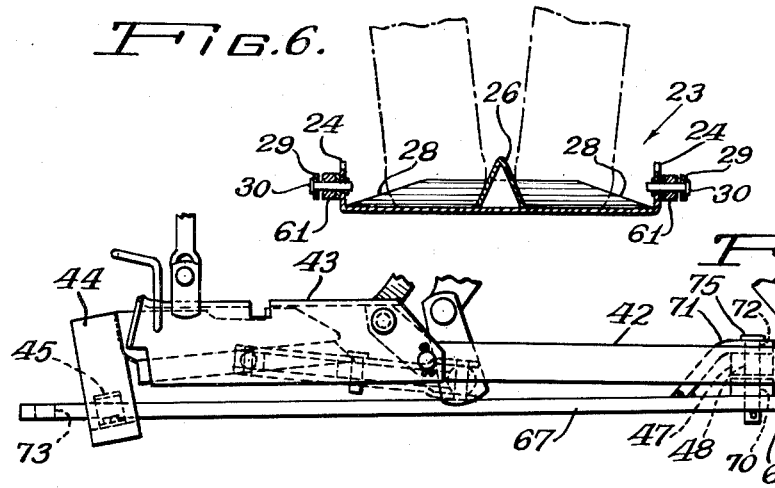
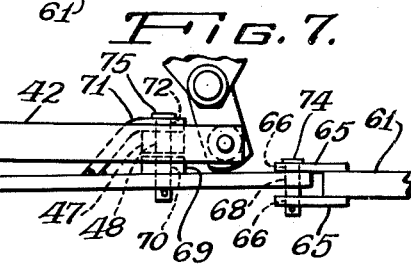
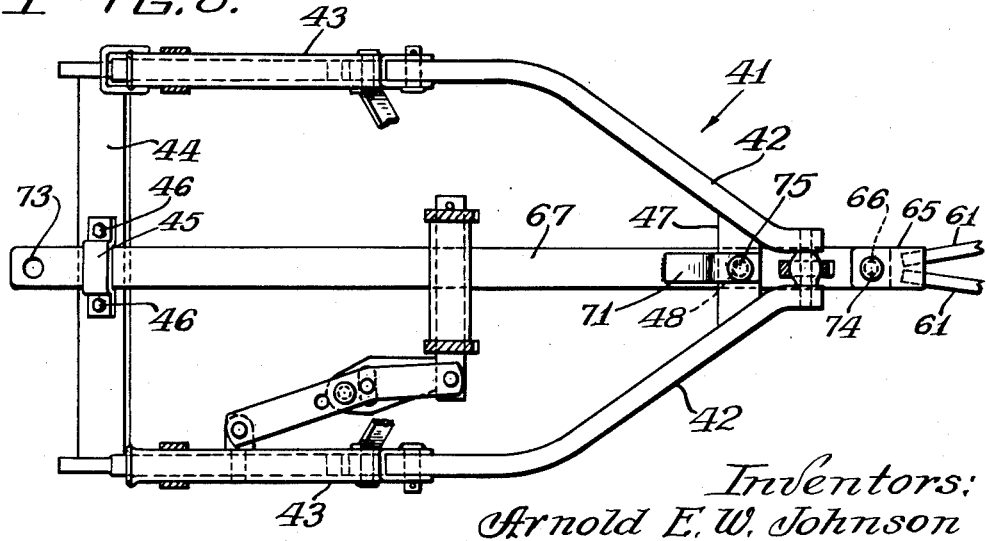

United States Patent Office 3,127,193
Patented Mar. 31, 1964

3,127,193
TANDEM TRACTOR HITCH
Arnold E. W. Johnson, Oak Park, and Robert L. Giddings, Downers Grove, Ill., assignors to International Harvester Company, Chicago, Ill., a corporation of New Jersey
Filed July 10, 1962, Ser. No. 208,846
3 Claims. (Cl. 280—402)

The present invention relates generally to improvements in tandem hitches for a pair of tractors and more particularly to a new and improved pan-type tandem tractor hitch.

The infrequent requirement for tractor having a relatively high power output on an average-size farm often does not justify the expense of purchasing a tractor for these occasional situations. Although the large tractor might be used for jobs that do not require its complete power output, such an operation is uneconomical because the tractor will be operating at a low efficiency and because of the high initial cost. The hitch involved in the present invention enables the farmer to combine a pair of small tractors in tandem when relatively high output power is required. This permits the farmer to have the versatility of two relatively small tractors plus a unit that can deliver a relatively high output when necessary. The tractor hitch of this invention further permits the hitching of the tractors without special adaptation such as removing the front wheels as is required in the tandem hitch disclosed in U.S. Patent 2,962,300 to Garman.

The general purpose of this invention is to provide a tandem hitch which will permit readily hitching two tractors in tandem such that the power from both tractors can be applied through the drawbar to a single load or implement. To obtain this, the drawbar of the forward tractor is provided with a pivotally mounted pan upon which the front wheels of the rear tractor are driven, which pan is then raised by the conventional hitching mechanism, and the drawbar of the forward tractor is then connected to the drawbar of the rear tractor through a drawbar connector.

An object of the present invention is the provision of a tandem hitch for tractors in which the front wheels of the tractors need not be removed.

Another object is to provide a tandem hitch for tractors involving a minimum of special adaptation of the standard hitch of the tractors.

A further object of the invention is the provision of a tandem hitch for tractors which requires no special tools to perform the hitching operation.

Still another object is to provide a tandem hitch for tractors in which both tractors are controlled from the rear tractor.

These and other objects of the invention will become more apparent from the specification and drawings, wherein:

FIGURE 1, which is continued in FIGURE 1A, shows a perspective view of the rear tractor having one of the rear wheels cut away to better illustrate the drawbar connection;

FIGURE 1A, which is a continuation of FIGURE 1, shows a perspective view of the front tractor having one of the rear wheels cut away to better illustrate the drawbar and its special adaptations;

FIGURE 2 is a plan view of FIGURE 1;

FIGURE 2A is a plan view of FIGURE 1A;

FIGURE 3 is a side view of the front tractor drawbar and its pivotally mounted span;

FIGURE 4 is a plan view of FIGURE 3;

FIGURE 5 is a section view taken along lines 5—5 of FIGURE 3;

FIGURE 6 is a section view taken along lines 6—6 of FIGURE 3;

FIGURE 7 is a side view of the rear tractor drawbar and drawbar connection; and

FIGURE 8 is a plan view of FIGURE 7.

Referring now to the drawings, wherein like reference characters designate like or corresponding parts throughout the several views, there is shown in FIGURES 1, 1A, 2, and 2A a composite view of the front tractor 10 tandemly hitched to the rear tractor 40. In these drawings, the front tractor hitch 11 and the rear tractor hitch 41 comprise conventional two-point tractor hitching structure of the type disclosed in U.S. Patent No. 2,776,613 to Orelind. It should be noted, of course, that this hitch is shown only for the purpose of illustration and the invention is not intended to be limited to use with this particular hitch. Special modifications to these hitches 11 and 41 will later be explained in detail. The hitch 11 of the front tractor includes a U-shaped drawbar 12 having a pair of socket members 13 connected together by transverse bars 14 and 18. A pan 23 is pivotally mounted to said transverse bars 14 and 18 about a kingpin 22. The hitch 41 of the rear tractor includes a U-shaped drawbar 42 which is connected to the U-shaped drawbar 12 of the front tractor by a drawbar connector generally designated 60. The drawbar connector 60 comprises a pair of elongated members 61 that are pivotally mounted to each side of the pan 23 and extend rearwardly beneath the rear tractor where they are connected by a vertical pivot pin 74 to the drawbar connector continuation 67. The drawbar connector continuation 67 is pivotally connected to the U-shaped drawbar 42 of the rear tractor hitch 41 by a pivot pin 75 and extends rearwardly through a saddle 45 that is mounted on the bayonet member 44 of said hitch 41. An aperture 73 is provided in the rearwardmost portion of drawbar connector continuation 67 for the purpose of connecting the implement or load to the tandemly arranged tractors.

In hitching the tractors 10 and 40 together the rear tractor 40 is positioned with its front wheels on the pan 23 that is mounted on the hitch 11 of the front tractor. When positioning the front wheels of the rear tractor on said pan, the pan is in a lowered position such that it is resting on the ground and after the wheels are positioned the hitch 11 is hydraulically raised to the position shown in FIGURE 1. The hitch 11 comprises drawbar 12 that is swingably supported upon a tractor to a pivotal connection 80. The drawbar 12 is raised and lowered about its pivotal connection by raising and lowering the vertical links 81. A shaft 82 is pivotally supported by the tractor frame and includes a pair of arms 83 secured thereto for rotation therewith, said arms 83 are pivotally connected to the vertical links 81 about pivot points 84, the shaft 82 also has an integral rock arm 85 that is pivotally connected to the piston rod 86 of a hydraulic ram 87. Upon actuation of hydraulic ram 87 rock arm 85 is rotated which in turn rotates shaft 82 and arms 83 which raises vertical links 81 and pivots the drawbar 12 about its pivotal connection 80. This is a conventional device for controlling the hitch and reference may be made to the patent to Orelind et al. 2,952,323 for a more detailed disclosure. The drawbar connector 60 is then mounted upon the U-shaped drawbar 12 of the front hitch and the U-shaped drawbar 42 of the rear hitch, and the control lines 50 are mounted such that both tractors can be controlled by the operator on the rear tractor. A shield 31, as best seen in FIGURES 1 and 2, can be mounted upon the pan 23 to protect the control lines 50. Also, a chain 32 as seen in FIGURE 1 can be provided as a safety measure connecting the front wheel fork to the pan.

Referring now to FIGURES 3 to 6, inclusive, for a detailed description of the special modifications of the hitch 11 of the front tractor and its pivotally mounted pan 23, an upper transverse bar 14 is secured to the upper end portions of the socket members 13 and a lower transverse bar 18 is secured to the lower end portions of said socket members 13. As can be best seen in FIGURE 5, the upper transverse bar is generally level and bowed upwardly towards its midpoint, while the lower transverse bar 18 is inclined slightly to the horizontal. This bowing of the upper bar and inclination of the lower bar adds rigidity to the hitch structure and provides a larger bearing surface for the collar 25 with the kingpin 22. A gusset plate 15 is secured to the upper surface of the upper transverse bar 14 and extends rearwardly therefrom and includes a reinforcement plate 16 secured to its upper surface. An aperture 17 is formed through the reinforcement plate 16 and the rearwardly extending portion of the gusset plate 15. The lower transverse bar 18 is also provided with a gusset plate 19 having a reinforcement plate 20 secured to its upper surface and through which an aperture 21 in alignment with aperture 17 is provided. Said aligned apertures 17 and 21 are adapted to receive the kingpin 22 which functions to pivotally mount the pan 23 to the hitch 11. The upper and lower transverse bars 14 and 18 along with their plates and apertures are the only special adaptations required to be made to the front hitch 11.

The pan 23 is constructed of sheet material having upstanding sides 24 around all except its rear edge. The front edge of the pan is provided with a collar 25 which is dimensioned to fit between the upper and lower gusset plates 15 and 19 of the hitch 11 in alignment with the apertures 17 and 21 to receive the kingpin 22. The pan is provided with a V-shaped center divider 26 which functions to locate the wheels on the pan and also to add rigidity and strength to the pan. A pair of rearwardly extending arms 29 are mounted on each of said sides 24 and are adapted to receive pivot pins 30 which pivotally mount the pair of elongated members 61 of the drawbar connectors to the pan. A shield 31 made of sheet material can be mounted on the forward portion of the pan to prevent the control lines 50 which extend between the tractors from being entangled with the pivoting hitch arrangement. A safety chain 32 can be secured to the pan about the pivot pin 30 for connection to the fork of the front wheel of the rear tractor, as a safety precaution.

Referring now to FIGURES 4, 7 and 8, the hitch 41 of the rear tractor and the drawbar connector 60 connecting the U-shaped drawbar 12 of the front tractor to the U-shaped drawbar 42 of the rear tractor shall be explained in detail. The hitch 41 of the rear tractor, as previously mentioned, is a conventional two-point hitch comprising a U-shaped drawbar 42 terminating in socket members 43 into which a bayonet member 44 is mounted. A saddle 45 is secured by bolts 46 to the transverse portion of said bayonet member 44. A crossbar 47, having an aperture 48 formed therein, is secured across the bight portion of said U-shaped drawbar 42. The drawbar connector 60 comprises two main portions, a pair of elongated members 61 and a drawbar connector continuation 67. The pair of elongated members 61 have apertures 63 formed in their forward ends which are adapted to receive the pivot pins 30 that extend through the arms 29 of the pan 23 to connect said pair of elongated members 61 to the pan 23 about a horizontal pivot axis. To add rigidity to the pair of elongated members a spacer bar 64 is provided, as can be seen in FIGURE 2. The rearward ends of said pair of elongated members terminate in a pair of plates 65 having an aligned aperture 66 formed therein. The drawbar connector continuation is formed from a bar 67 having an aperture 68 at one end and an aperture 73 at the opposite end. The drawbar connector continuation is adapted to extend between the plates 65 wherein pivot pin 74 connects the drawbar connector continuation to the pair of elongated members 61 about a vertical axis. The rearward end of the drawbar connector continuation is held in place by extending through the slot formed by the saddle 45 that is secured to the bayonet 44. The drawbar connector continuation 67 is connected to the U-shaped drawbar 42 of the rear hitch 41 by way of an arm 71 secured to the upper surface of said drawbar connector continuation 67. Said arm 71 has a portion that overlies and is spaced from the drawbar connector continuation 67 and aligned aperture 72 is formed through the arm 71 and the drawbar connector continuation 67. A reinforcing plate 69 is secured to the upper surface of the drawbar connector continuation 67 about said aperture 72. The aperture 72 is aligned with the aperture 48 formed in the crossbar 47 of the hitch 41 and the two members are then pinned together by pivot pin 75.

The implement or load to be pulled by the tandem arrangement is secured to the drawbars through the aperture 73 formed in the rearmost portion of drawbar connector continuation 67. Thus it is seen that the load carried by the tandem tractor arrangement is distributed to the two tractors through the U-shaped drawbars of the tractor hitches. Since the tractor is designed to be connected to its load through the U-shaped drawbars, the tractors used in this tandem arrangement will not be subjected to any stresses for which they were not designed to withstand.

Operation

In preparing the tractors to be tandemly hitched the U-shaped drawbar having the special transverse bars mounting the kingpin is mounted on the front tractor. The rear tractor need only be provided with a bayonet having a saddle secured thereto for aligning the drawbar connector continuation. The hitch of the front tractor is lowered and the pan is secured to the hitch by the kingpin 22 and the rear tractor is then driven onto the pan. The hitch of the front tractor is then raised and the U-shaped drawbars are connected by the drawbar connectors which requires no special tools since it involves merely the insertion of four pivot pins. The control lines 50 are then connected between the two tractors so that the operator who is seated on the rear tractor can control both tractors from this position.

Obviously, many modifications and variations of the present invention are possible in the light of the above teachings. It is therefore to be understood, that within the scope of the appended claims, the invention may be practiced otherwise than is specifically described.

What is claimed is:

1. The combination of a front tractor, a rear tractor, and means for tandemly hitching said tractors; said means comprising a hitch pivotally mounted on said front tractor; hydraulic means for raising and lowering said hitch about its pivotal connection to the front tractor; a substantially flat pan, adapted to receive the front wheels of said rear tractor, secured to said hitch about a vertical pivot; connector means for joining said pan to said rear tractor, such that a load connected to said rear tractor will be distributed to both the front and rear tractors; and wherein said rear tractor is provided with a hitch, and said connector means comprises a pair of elongated members secured to said opposite sides of said pan about horizontal pivots, said pair of elongated members extending rearwardly beneath the rear tractor and connected to said rear tractor hitch.

2. The combination of a front tractor having a hitch including a U-shaped drawbar, a rear tractor having a hitch including a U-shaped drawbar, and means for tandemly hitching said tractors; said means for tandemly hitching said tractors comprising a transverse bar bridging the open end of said front tractor's U-shaped drawbar, a substantially flat pan secured through a vertical pivot to said transverse bar, and connector means joining said pan to said rear tractor's U-shaped drawbar such that a load connected to said rear tractor will be distributed to both the front and rear tractors.

3. The invention as set forth in claim 2 wherein said connector means comprises a pair of elongated members secured to opposite sides of said pan about horizontal pivots, said pair of elongated members extending rearward beneath the rear tractor and connected to said rear tractor's U-shaped drawbar.

References Cited in the file of this patent
UNITED STATES PATENTS

| | | |
|---|---|---|
| 1,860,518 | Wells | May 31, 1932 |
| 1,864,781 | Wells | June 28, 1932 |
| 2,375,970 | Williams | May 15, 1945 |
| 2,726,777 | Wiley | Dec. 13, 1955 |
| 2,849,073 | Gaspardo | Aug. 26, 1958 |
| 3,051,337 | Nelson | Aug. 28, 1962 |